(12) United States Patent
Xie et al.

(10) Patent No.: US 9,785,382 B2
(45) Date of Patent: Oct. 10, 2017

(54) METHOD AND APPARATUS FOR READ RETRY SEQUENCE FOR BOOT ROM

(71) Applicant: FREESCALE SEMICONDUCTOR, INC., Austin, TX (US)

(72) Inventors: Yangyi Xie, Shanghai (CN); Chongbin Fan, Shanghai (CN); Zhipeng Tang, Shanghai (CN)

(73) Assignee: NXP USA, INC., Austin, TX (US)

( * ) Notice: Subject to any disclaimer, the term of this patent is extended or adjusted under 35 U.S.C. 154(b) by 66 days.

(21) Appl. No.: 14/887,316

(22) Filed: Oct. 19, 2015

(65) Prior Publication Data

US 2016/0306593 A1 Oct. 20, 2016

(30) Foreign Application Priority Data

Apr. 14, 2015 (CN) .......................... 2015 1 0262061

(51) Int. Cl.
| | |
|---|---|
| *G06F 12/00* | (2006.01) |
| *G06F 3/06* | (2006.01) |
| *G06F 12/127* | (2016.01) |
| *G06F 12/06* | (2006.01) |

(52) U.S. Cl.
CPC .......... *G06F 3/0659* (2013.01); *G06F 3/0619* (2013.01); *G06F 3/0679* (2013.01); *G06F 12/0646* (2013.01); *G06F 12/127* (2013.01)

(58) Field of Classification Search
CPC .... G06F 3/0619; G06F 3/0659; G06F 3/0679; G06F 12/0646; G06F 12/127

USPC .......... 711/103, 154, 166, 170; 710/10, 104
See application file for complete search history.

(56) References Cited

U.S. PATENT DOCUMENTS

| | | | |
|---|---|---|---|
| 5,835,761 A * | 11/1998 | Ishii | ........................ G06F 8/65 713/100 |
| 8,090,955 B2 | 1/2012 | Pekny | |
| 8,103,936 B2 | 1/2012 | Pekny et al. | |
| 8,667,368 B2 | 3/2014 | Gupta et al. | |
| 8,687,422 B2 | 4/2014 | Pekny et al. | |
| 8,850,292 B2 | 9/2014 | Lee | |
| 2004/0078679 A1* | 4/2004 | Cagle | .................... G06F 9/4406 714/36 |
| 2013/0013905 A1* | 1/2013 | Held | ..................... G06F 21/575 713/2 |
| 2013/0080858 A1 | 3/2013 | Lee | |
| 2013/0151767 A1* | 6/2013 | Berke | ................. G06F 11/1048 711/105 |
| 2014/0101519 A1 | 4/2014 | Lee et al. | |
| 2015/0185808 A1* | 7/2015 | Gough | .................. G06F 1/3234 713/320 |

* cited by examiner

*Primary Examiner* — Reba I Elmore
(74) *Attorney, Agent, or Firm* — Charles E. Bergere

(57) ABSTRACT

A memory system capable of running a variety of different read retry sequences includes a memory controller that has a boot ROM with stored code for executing a read retry sequence. A non-volatile memory device such as a NAND flash includes a read retry register and receives command instructions including a read retry instruction from the memory controller and in response provides read data. A second non-volatile memory that is external to the NAND flash has a read retry table describing read retry sequence items that include a command, a read retry register address, and read retry data for updating the read retry register.

9 Claims, 2 Drawing Sheets

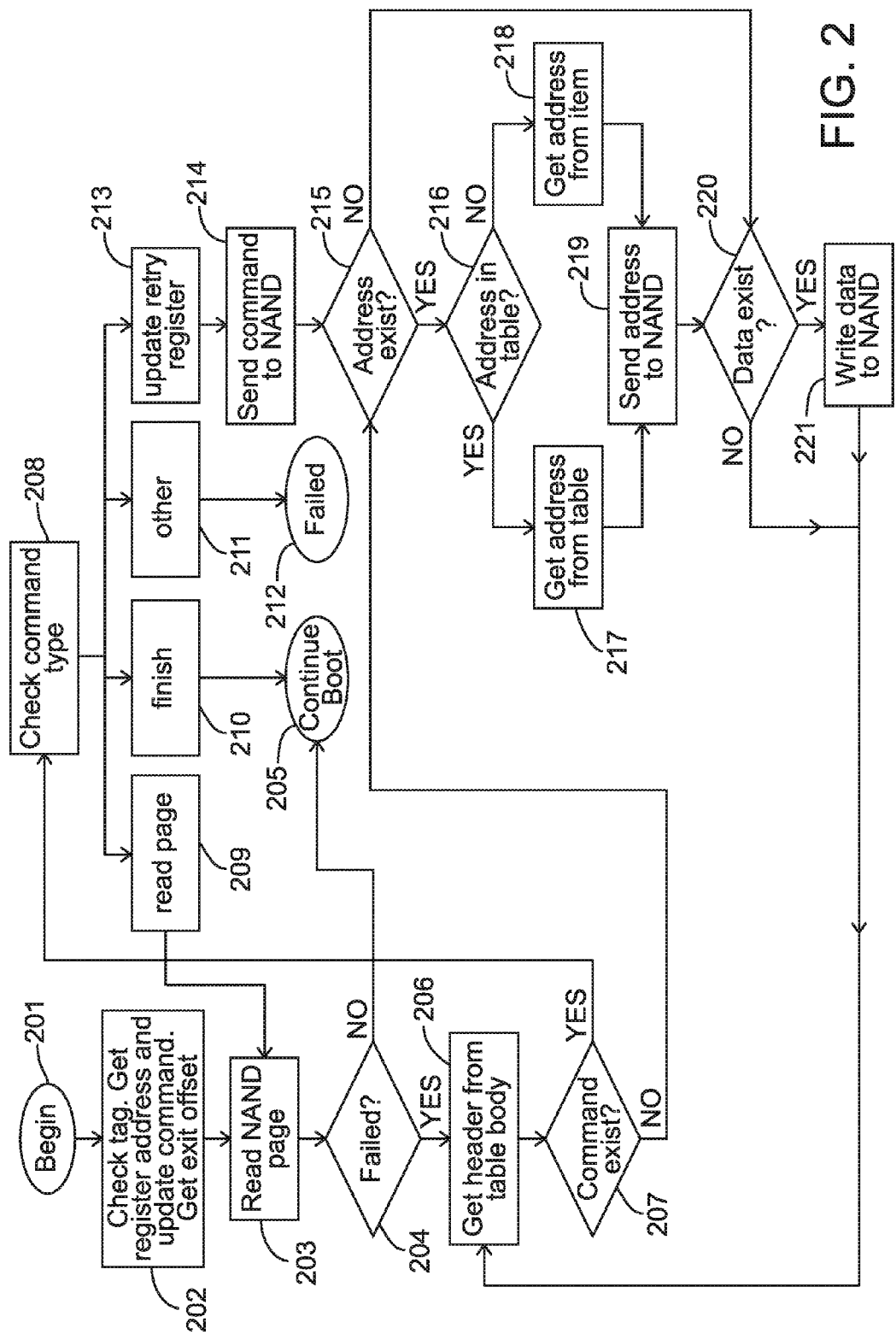

METHOD AND APPARATUS FOR READ RETRY SEQUENCE FOR BOOT ROM

BACKGROUND

The present invention relates generally to nonvolatile memory systems and, more particularly, to a method and apparatus for reading data from a nonvolatile memory device.

Nonvolatile memory devices include flash memory devices, such as NAND flash, electrically erasable programmable read-only memory (EEPROM) devices, and resistive memory devices. In certain nonvolatile memory devices such as flash memory, as the number of program/erase cycles increases, reliability decreases. An error correction coding (ECC) circuit may be used to correct errors in data read from a flash memory device. When it is difficult or not possible to correct errors using the ECC circuit, a data read retry operation (or sequence) may be performed.

In one known system, if a read command that is sent from a memory controller to a nonvolatile memory device results in read data having errors that cannot be corrected by an ECC, then a read retry command is issued instructing the memory to read the same page but using a different operating parameter, such as the magnitude of the reference voltage that is applied to the word line of a page and may be retrieved from a look up table residing in the memory controller. Different manufacturers of NAND flash memory tend to employ different read retry sequences for their respective products and new sequences are continually being introduced. A boot ROM typically may be used to support a read retry sequence but boot ROMs cannot be updated and therefore a boot ROM is incapable of supporting newly introduced read retry sequences.

Hence it would be advantageous to provide a capability to perform different read retry sequences. It would also be advantageous to be able to perform different read retry sequences without any need for a change in boot ROM code.

BRIEF DESCRIPTION OF THE DRAWINGS

The invention, together with objects and advantages thereof, may best be understood by reference to the following description of preferred embodiments together with the accompanying drawings in which:

FIG. 2 is a flow chart illustrating a method of performing a read retry sequence in accordance with an embodiment of the invention.

DETAILED DESCRIPTION OF PREFERRED EMBODIMENTS

Figure 1:
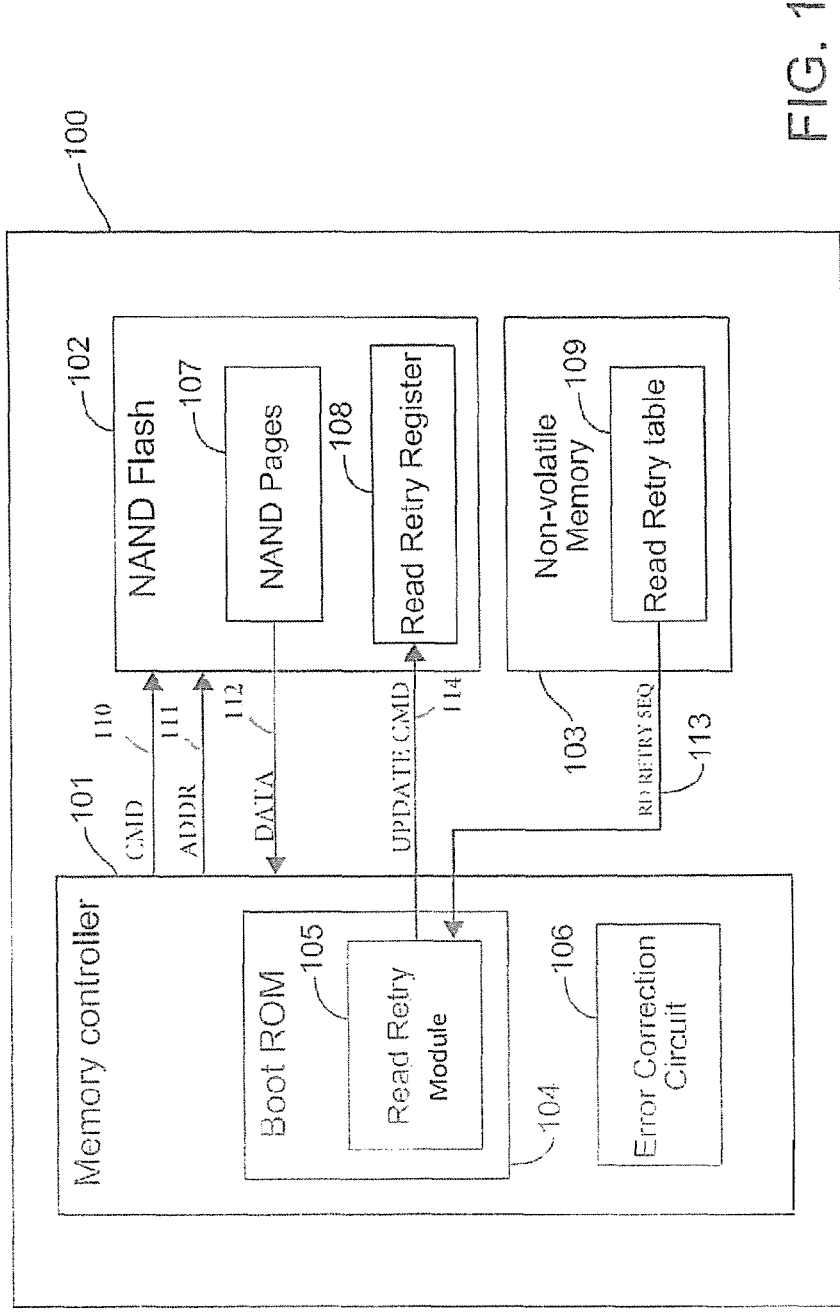
FIG. 1 is a simplified schematic block diagram of a memory system in accordance with an embodiment of the invention.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a memory system comprising a memory controller including a boot Read Only Memory (ROM) having stored therein code for executing a read retry sequence, and a first nonvolatile memory (NVM) operably coupled to the memory controller. The first NVM includes a read retry register. The first NVM receives command instructions including a read retry instruction from the memory controller and in response provides read data thereto. A second NVM external to the first NVM and operably coupled to the memory controller is provided. The second NVM includes a read retry table having a header describing read retry sequence items that include at least one of a command, an address and data.

In another embodiment, the present invention provides a method for operating a NVM in a memory system, where the memory system includes a memory controller operably coupled to the NVM and including a boot ROM having stored therein code for executing a read retry sequence in the NVM. The NVM includes a read retry register for receiving an update command from the boot ROM. The method comprises accessing, by the boot ROM, a read retry sequence from a read retry table stored in an external NVM, where the read retry table comprises a header describing read retry sequence items that include at least one of a command, an address and data.

Advantageously, by using a second NVM external to the first NVM (a NAND flash memory, for example) to describe the NAND flash memory's reset retry sequence, and by providing a read retry function in the boot ROM, a multiplicity of different retry sequences can be supported so no update of boot ROM code is necessary when a new sequence is introduced.

Referring now to FIG. 1, a simplified schematic block diagram of a memory system 100 in accordance with an embodiment of the invention is shown. The memory system 100 comprises a memory controller 101, a NAND flash memory 102 and a non-volatile memory (NVM) 103. The NAND flash memory 102 and the NVM 103 are both operably coupled to the memory controller 101. In one embodiment, the memory controller 101, the NAND flash memory 102 and the NVM 103 are implemented in an integrated circuit.

The memory controller 101 includes (amongst other modules) a boot ROM 104. The boot ROM 104 is provided with a read retry module 105 for supporting a read retry sequence. The memory controller 101 also includes an error correction circuit 106. The NAND flash memory 102 contains NAND pages 107 and is provided with a read retry register 108 that can be updated in a read retry sequence. In some embodiments there is more than one read retry register. The read retry register 108 contains read retry voltage level information for changing a comparison voltage when re-reading a NAND memory cell. The NVM 103 includes a read retry table 109 for supporting a read retry sequence.

The memory controller 101 generates a command and applies the command to the NAND flash memory 102 on a line 110. The command can comprises a program command, a read command, or an erase command. Typically, the command controls a program, read or erase operation of the NAND flash memory 102. The memory controller 101 also generates an address and applies the address to the NAND flash memory 102 on a line 111. An address typically comprises multiple bits and corresponds to a location of data (to be read or erased, for example) in the NAND pages 107.

The NAND flash memory 102 performs a program and a read operation in units of pages. Each physical page typically includes a plurality of memory cells connected to a respective word line. Read data that has been read from the NAND pages 107 is sent from the NAND flash memory 102 to the memory controller 101 on a line 112.

The error correction circuit 106 detects and corrects errors in the read data received from the NAND flash memory 102.

Different read retry sequences are stored (burnt) into the NVM 103 and the code that parses and executes a read retry sequence is located in boot ROM code in the boot ROM 104. The read retry module 105 in the boot ROM 104 receives a read retry register update command and other relevant information on a line 113 from the read retry table 109 in the NVM 103 and in response is arranged to apply an update command on a line 114 to the read retry register 108 in the NAND flash memory 102. The read retry module 105 is arranged to support different read retry sequences, so parses the retry data received from the read retry table 109 as appropriate.

The read retry table 109 comprises a table head and a table body. The read retry table 109 describes a NAND read retry sequence. A typical abstract read retry sequence comprises a pre-condition command, a first read retry command, a second read retry command, and an exit command. Some sequences may have pre-condition commands and others may not. Some sequences may have update register commands while others may not.

In the table head of the read retry table 109 are included an 'update register command' that relates to updating the read retry register 108, a 'retry register address array', which is an array of read retry register addresses, and a 'retry register address array size', which relates to the size (that is the length) of the array of read retry register addresses. It will be noted that a command does not change between different retry sequences and register addresses do not change between different retry voltage levels. The table head also includes a 'tag' that identifies the read retry table 109. The table head also includes an 'exit offset.' This is the offset for exiting a read retry sequence when a retry has succeeded.

The table body of the read retry table 109 includes a set of at least one header/item pairs. In this example, a header and an item each comprise one byte. The header describes a read retry sequence item and identifies whether the item is a command, an address or data and which one is determined by the instructions cmd_exist, addr_exist, data_exist respectively.

The format of the header is as follows. A 'cmd_type' instruction of three bits indicates the type of retry command. Such a command can include, for example, update the read retry register 108, read a page and 'finish.' An 'addr_in_tbl' instruction of one bit instructs the read retry module 105, if this instruction is at a logical 1, to use the retry register address array stored in the read retry table head to obtain the address for the read retry register 108. If at a logical '0', this instruction instructs the read retry module 105 to use the address information contained in the item that follows that header. An 'update_cmd_tbl' instruction of 1 bit instructs the read retry module 105, if this instruction is at a logical '1,' to use the update register command in the read retry table head and if at a logical 0, to use of the command information contained in the item following that header. A data_exist instruction when at a logical '1,' identifies the existence of update data in the sequence, and if at a logical '0' then no such update data exists. An addr_exist instruction, if at a logical '1' indicates that a register address exists in the sequence, and if at a logical '0,' then no such register address exists. A cmd_exist instruction, if at a logical '1,' indicates the existence of an update register command in the sequence, and if at a logical '0,' then no such command exists.

Reference will now be made to the flow chart of FIG. 2. At step 201, a read operation (which includes a read retry sequence) begins.

At step 202, the read retry module 105 checks the tag in the read retry table 109. Also at step 202, the read retry module 105 obtains a register address, update command, and exit offset from the read retry table 109.

At step 203, an instruction is sent from the memory controller 101 to the NAND flash 102 to read a page and return the data to the memory controller 101.

At step 204, using the error correction circuit 106, the memory controller 101 checks to determine whether the read operation has failed or succeeded.

If it has not failed then the method proceeds to step 205 "continue boot". This step comprises completing subsequent booting tasks such as image authentication, for example.

If on the other hand, the read operation has failed, then a read retry sequence is invoked and at step 206, the header from the header/item pair in the read retry table body is accessed by the read retry module 105.

At step 207, the read retry module 105 determines (from the header) whether or not a command exists.

If a command does exist, then the method proceeds to step 208 where a check is made by the read retry module 105 to determine the type of command.

If the command is to read a page (step 209), then the process reverts to step 203 where a command to read a page is sent to the NAND flash memory 102 from the memory controller 101.

If the command is to 'finish' (step 210) then the method reverts to step 205 'continue boot.'

If the command is "other" (step 211) then the process has failed (step 212) and subsequently terminates. Such a command would be one that is not supported by the read retry module 105 in the boot ROM 104, for example, ones formed by users by mistake.

If the command is 'update retry register' (step 213) then at step 214 the read retry module 105 sends the update command to the NAND flash memory 102 so that the value of the read retry register 108 may be updated.

Referring back to step 207, the read retry module 105 determines that a command does not exist, the process continues at step 215 (also following on from step 214) where the read retry module 105 determines whether or not a read retry register address exists.

If it is determined that a read retry register address does exist, then at step 216, the read retry module 105 determines whether or not the read retry register address is in the read retry table 109.

If the address is found in the table then at step 217 the read retry register address is retrieved from the table by the read retry module 105.

If the address is not in the table then at step 218 the read retry register address is retrieved from the data contained in the item following the header in the table body.

In either case, at step 219, the retrieved read retry register address is sent to the NAND flash memory 102 by the read retry module 105 and the method proceeds to step 220.

Referring back to step 215, if an address did not exist, the method also proceeds to step 220 where the read retry module 105 determines whether read retry data exists in the table body item or not.

If no read retry data exists then the method reverts to step 206.

If, on the other hand, read retry data does exist, then at step 221 the read retry data is retrieved from the read retry table 109 by the read retry function 103 and written to the NAND flash memory 102. On receiving the read retry data, along with the update command and the read retry register address (if one exists), the read retry register 108 is updated with the read retry data that is used to change a comparison voltage level when next reading a memory cell.

After the write operation has been done, the process may revert to step 206 to repeat the cycle in case another read retry register (not shown) in the NAND flash memory needs to be updated.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A memory system, comprising:
    a memory controller including a boot Read Only Memory (ROM) having stored therein code for executing a read retry sequence;
    a first non-volatile memory, operably coupled to the memory controller, including a read retry register for receiving command instructions from the memory controller including a read retry instruction and in response providing read data; and
    a second non-volatile memory, external to the first non-volatile memory, operably coupled to the memory controller, wherein the second non-volatile memory includes a read retry table having a header describing read retry sequence items that include at least one of a command, an address, and data,
    wherein the read retry table comprises a table head and a table body, wherein the table body comprises at least one set of header/item pairs, and the table head includes at least one of a tag identifying the read retry table, an address of the read retry register, a command, and an exit offset.

2. The memory system of claim 1, wherein the boot ROM is arranged to access a read sequence item from the read retry table and send an update command to the read retry register.

3. The memory system of claim 1, wherein the boot ROM is arranged to access at least one of the address of the retry register and the command, and to send an update command to the read retry register.

4. The memory system of claim 1, wherein the command comprises at least one of an update command, a read page command, and a finish command.

5. The memory system of claim 1, wherein the data comprises read retry data for updating a voltage level used by the first non-volatile memory in a read operation.

6. The memory system of claim 1, wherein the first non-volatile memory is a NAND flash memory.

7. A method for operating a non-volatile memory in a memory system, the memory system comprising a memory controller operably coupled to the non-volatile memory and including a boot Read Only Memory (ROM) having stored therein code for executing a read retry sequence in the non-volatile memory, and the non-volatile memory including a read retry register for receiving an update command from the boot ROM, the method comprising:
    accessing by the boot ROM a read retry sequence from a read retry table stored in an external non-volatile memory, wherein the read retry table comprises a header describing read retry sequence items, the read retry sequence items including at least one of a command, an address, and data, wherein the read retry table comprises a table head and a table body, wherein the table body comprises at least one set of header/item pairs;
    in the boot ROM, accessing an update register command and a register address from the table head and sending an update command to the read retry register;
    if, on determining that no update register command or register address exists in the table head, accessing an update register command and register address contained in the table body.

8. The method of claim 7, further comprising:
    in the boot ROM, accessing data contained in the table body and sending said data to the read retry register for updating a voltage level used by the first non-volatile memory in a read operation.

9. An integrated circuit device, comprising:
    a memory controller including a boot Read Only Memory (ROM) having stored therein code for executing a read retry sequence;
    a NAND flash memory, operably coupled to the memory controller, including a read retry register for receiving command instructions including a read retry instruction from the memory controller, wherein in response to the read retry instruction, the flash memory provides read data; and a nonvolatile memory external to the NAND flash memory and operably coupled to the memory controller, wherein the nonvolatile memory includes a read retry table including a header describing read retry sequence items that include at least one of a command, an address, and data, wherein the read retry table comprises a table head and a table body, wherein the table body comprises at least one set of header/item pairs, and the table head includes at least one of a tag identifying the read retry table, an address of the read retry register, a command, and an exit offset.

* * * * *